Figure 1:
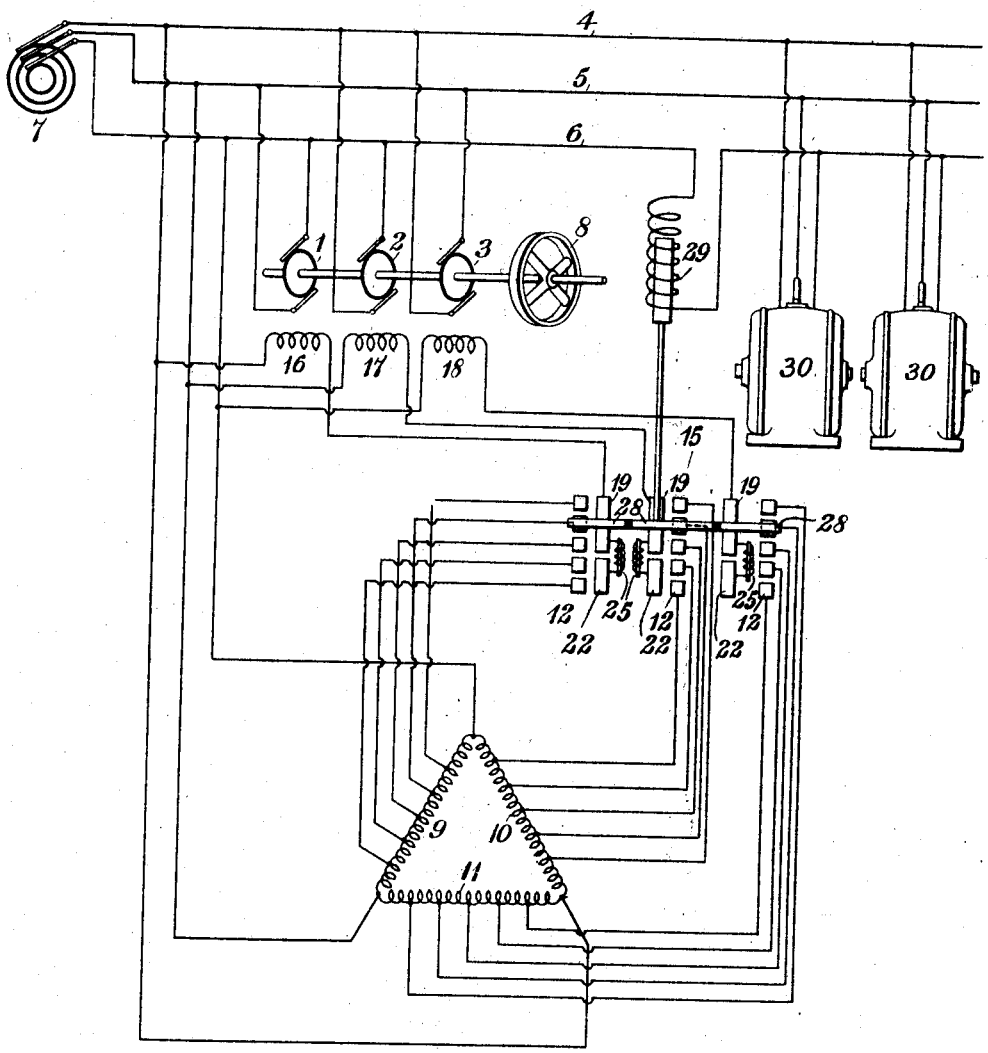

W. COOPER.
ELECTRICAL EQUALIZER SYSTEM.
APPLICATION FILED SEPT. 3, 1907. RENEWED MAY 20, 1910.

977,598.

Patented Dec. 6, 1910.

6 SHEETS—SHEET 1.

WITNESSES:

INVENTOR
William Cooper
BY
Wesley S. Carr
ATTORNEY

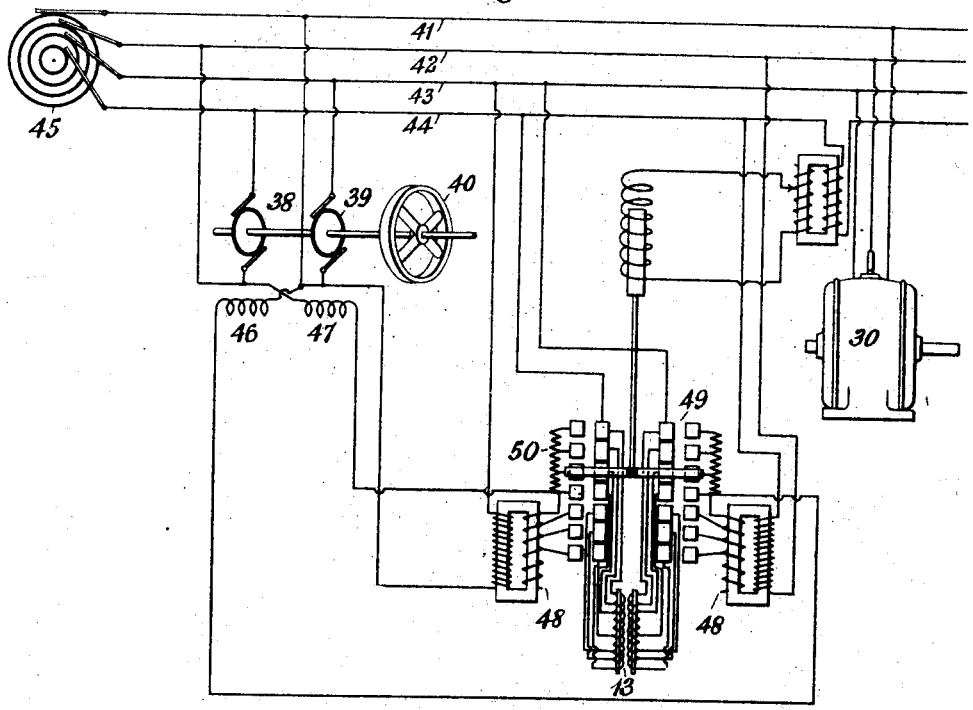
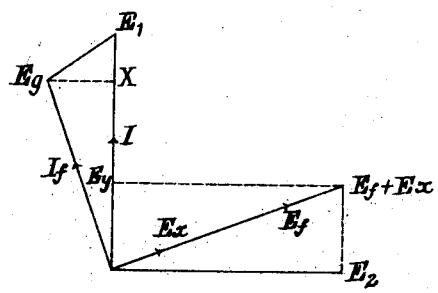
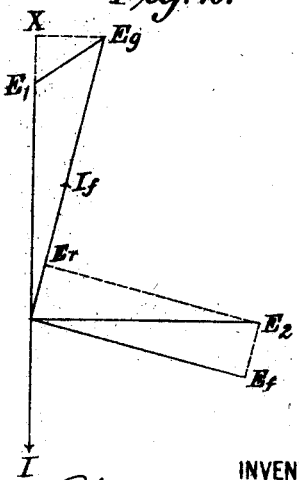

W. COOPER.
ELECTRICAL EQUALIZER SYSTEM.
APPLICATION FILED SEPT. 3, 1907. RENEWED MAY 20, 1910.

977,598.

Patented Dec. 6, 1910.
6 SHEETS—SHEET 6.

WITNESSES:
C. L. Belcher
Otto S. Schairer

INVENTOR
William Cooper
BY
Wesley S. Carr
ATTORNEY

UNITED STATES PATENT OFFICE.

WILLIAM COOPER, OF PITTSBURG, PENNSYLVANIA, ASSIGNOR TO WESTINGHOUSE ELECTRIC & MANUFACTURING COMPANY, A CORPORATION OF PENNSYLVANIA.

ELECTRICAL EQUALIZER SYSTEM.

977,598.   Specification of Letters Patent.   Patented Dec. 6, 1910.

Application filed September 3, 1907, Serial No. 391,224. Renewed May 20, 1910. Serial No. 562,526.

*To all whom it may concern:*

Be it known that I, WILLIAM COOPER, a citizen of the United States, and a resident of Pittsburg, in the county of Allegheny and State of Pennsylvania, have invented a new and useful Improvement in Electrical Equalizer Systems, of which the following is a specification.

My invention relates to systems of electrical distribution, and particularly to means for equalizing the load upon the generating or supply station when the load upon the system is variable.

The object of my invention is to provide simple and effective means that may be employed in connection with alternating current systems of any number of phases for absorbing or yielding energy in accordance with variations in load upon the system, in such a manner that the load upon the generating or supply station of the system may remain substantially constant or may not exceed a predetermined value.

It has heretofore been proposed to employ fly-wheels, or other devices having considerable inertia, in systems of distribution that supply translating devices requiring widely varying amounts of power, and to so drive the fly-wheels and control their operation that the load upon the distributing circuit will remain substantially constant, regardless of the variations in the amount of power required by the translating devices.

In the present system, a dynamo-electric machine, that may operate either as a motor or as a generator and to which a fly-wheel is mechanically coupled, is directly connected to the distributing circuit without the intervention of a rotary converter or other device, and the arrangement is such that but comparatively small and inexpensive machines need be provided and only a single equalizer set is necessary for equalizing the load provided by a plurality of translating devices.

The invention is especially adapted for use in connection with alternating current systems of distribution, and in its most useful embodiment it comprises a plurality of mechanically coupled dynamo-electric machines, of the commutator type, one for each phase of the system of distribution, a fly-wheel being also coupled to the said machines. The armatures of the machines are connected, respectively, to the various phases of the distributing circuit, and the field magnet windings are connected to phases of the circuit other than those to which the corresponding armatures are connected, in order that the generated and counter-electromotive forces of the armatures may be nearly of the same phases as the electromotive forces of the circuits to which they are connected. The machines are caused to operate alternately as motors and generators, by adjusting their field strengths, or otherwise, in accordance with the variations in the load afforded by the translating devices, energy being stored in the fly-wheel when operating the machines as motors and yielded for operating the machines as generators in order to supply current to the system.

It is not only desirable that the armature electromotive forces should be nearly of the same phase as those of the circuits to which they are connected, but also, under the most usual conditions, that the currents in the armature circuits be of approximately the same phases as the electromotive forces of the circuits to which the armatures are connected, and it is the specific object of the present invention to insure this result under substantially all conditions of load and whether the machines operate as motors or as generators.

Figure 2:
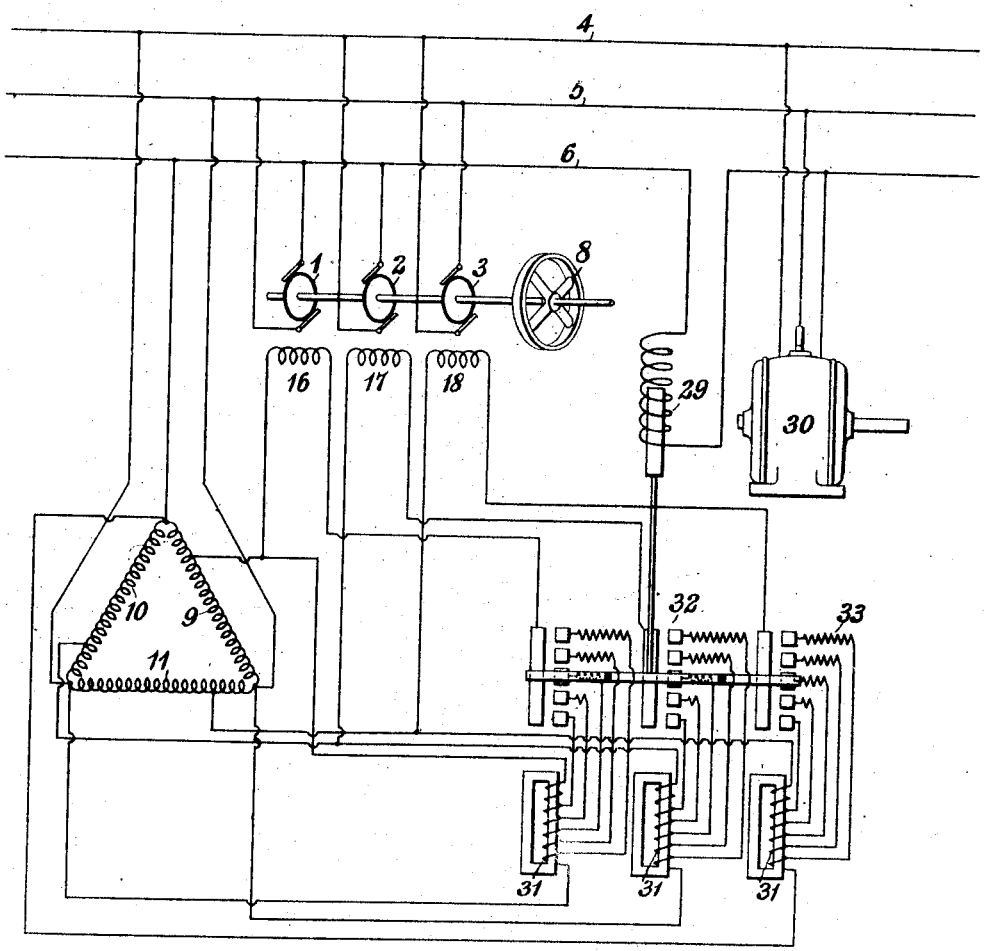
Figure 3:
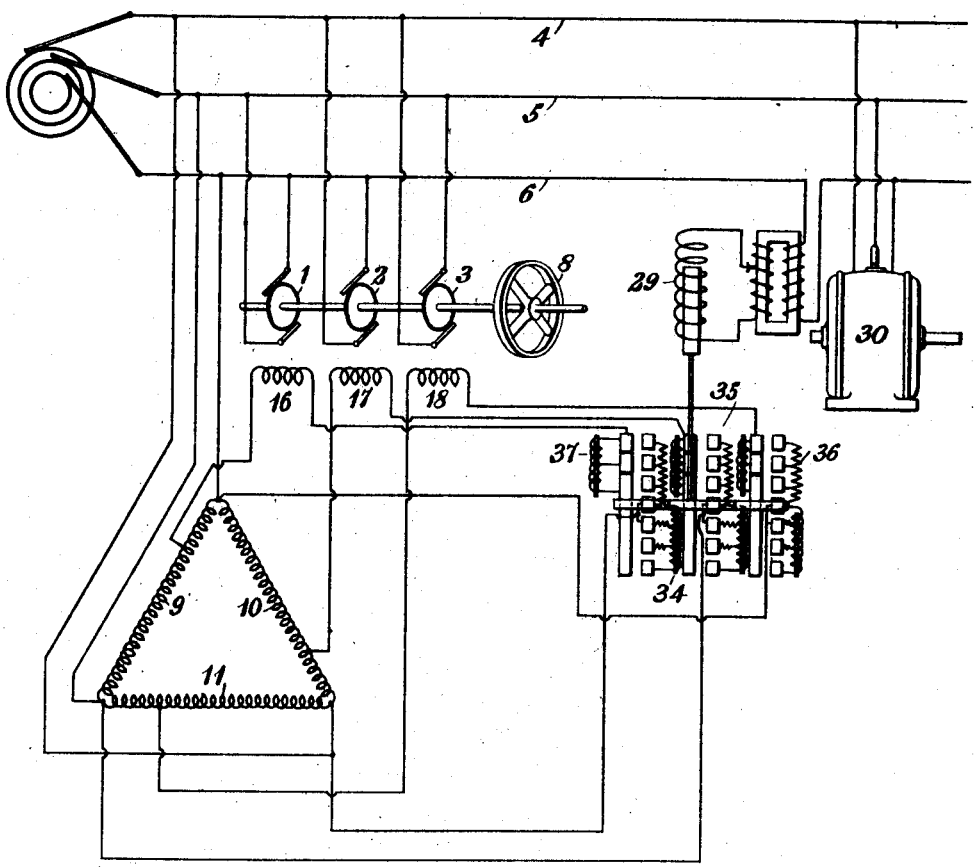
Figure 11:
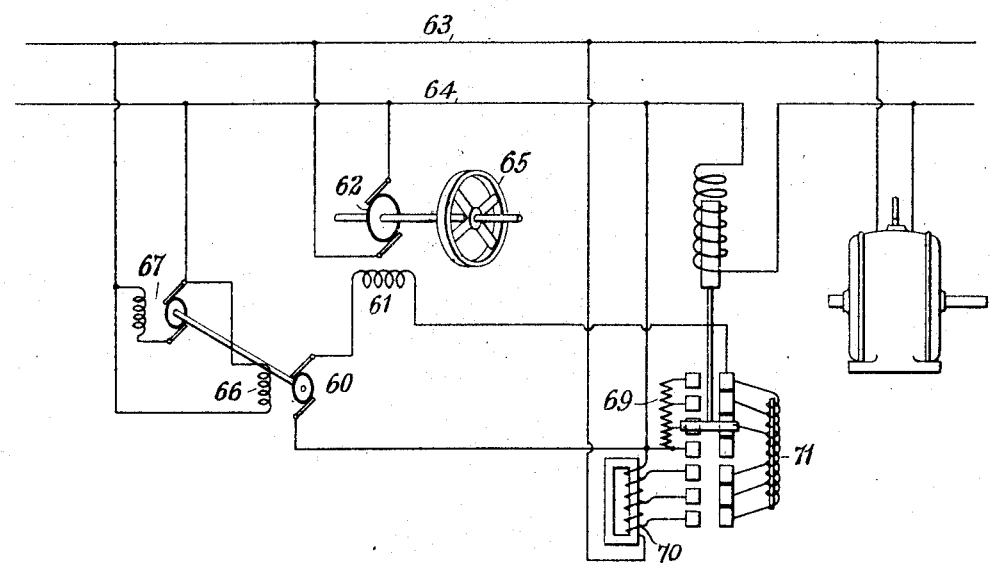

Figures 1, 2 and 3 of the accompanying drawings are diagrammatic views of three arrangements of the circuits of three-phase systems of distribution that embody my invention. Figs. 4, 5, 6 and 7 are vector diagrams illustrating the phase relations of the currents and electromotive forces in the systems shown in Figs. 1, 2 and 3. Fig. 8 is a diagrammatic view of a two-phase system of distribution embodying the invention, and Figs. 9 and 10 are vector diagrams illustrating the phase relations of the currents and electromotive forces in the system shown in Fig. 8, and Fig. 11 is a diagrammatic view of a single-phase system of distribution that embodies the invention.

In Fig. 1, mechanically coupled armatures 1, 2 and 3 of three dynamo-electric machines of the commutator type of construction, are connected, respectively, between the different pairs of conductors 4, 5 and 6 of a three-phase circuit that is supplied from a generator 7, or other suitable source, the armatures being provided with large masses, or a fly-wheel 8 being coupled thereto, in order that the rotatable system may possess considerable inertia. Also connected between the different pairs of conductors of the supply circuit are three sub-divided delta-connected windings 9, 10 and 11 of a three-phase transformer, the points of subdivision of the respective windings being connected to sets of stationary contact terminals 12 of a controlling device 15. Terminals of the field magnet windings 16, 17 and 18 of the dynamo-electric machines are connected, respectively, to the vertices of the delta-connected transformer windings 9, 10 and 11 that are opposite the windings which are connected to the same pairs of supply circuit conductors as the armatures. The remaining terminals of the field magnet windings are connected, respectively, to stationary contact strips 19 that are disposed adjacent to the sets of stationary contact terminals 12. The controller 15 comprises further stationary contact strips 22 that are arranged, respectively, in alinement with the strips 19, suitable impedance devices 25, that preferably have the same power factor as the field magnet windings 16, 17 and 18, being connected between the contact strips 19 and 22. It also comprises three movable conducting members 28 that are insulated from each other and are adapted to be moved over the respective sets of adjacent stationary contact terminals and strips by means of an electro-magnet having a winding 29 that is included in series with the supply circuit conductor 6.

The system may supply one or more suitable translating devices such as induction motors 30, the amount of current required by which may vary between wide limits. The controller 15 is, therefore, so constructed and adjusted that the positions of the movable conducting members 28 with respect to the corresponding stationary contact strips and terminals will be determined by the amount of current required by the translating devices. Thus, when the load upon the translating devices 30 is light and the current traversing the winding 29 is comparatively small in amount, or less than a predetermined amount, the movable conducting pieces 28 will bear upon the stationary contact strips 22 and the lower terminals 12, the field magnet windings 16, 17 and 18 being then connected to the transformer windings 9, 10 and 11 at such points as to apply electromotive forces thereto of such phases that the currents in the armature circuits will be substantially in phase with electromotive forces of the circuit 4—5—6. The impedance devices 25 are also included in circuit with the respective field magnet windings, the electromotive forces applied to the field magnet windings being thereby so reduced in amount that the counter-electromotive forces of the armatures 1, 2 and 3 will be less than the electromotive forces of the circuit 4—5—6. The machines will, therefore, operate as motors and cause energy to be stored in the fly-wheel 8. As the load upon the translating devices 30 increases and the current traversing the winding 29 also increases, the movable conducting pieces 28 are raised, thereby shifting the points of connection of the field magnet windings with the transformer windings 9, 10 and 11 in such manner that the currents in the armature circuits are maintained substantially in phase with the electromotive forces of the distributing circuit 4—5—6 under all conditions of motor load.

When the conducting pieces 28 engage the stationary strips 19, the impedance devices 25 are removed from the circuit, the field strengths of the dynamo-electric machines being accordingly increased, and the machines are now caused to operate as generators, the energy previously stored in the fly-wheel 8 being yielded and utilized as the actuating means for the machines. The points of connection of the field magnet windings 16, 17 and 18 with the transformer windings 9, 10 and 11 are also so adjusted when operating the machines as generators, that the electromotive forces generated by the armatures will bear such phase relations with respect to the electromotive forces of the circuit 4—5—6 as to cause the currents in the armature circuits to agree approximately in phase with the electromotive forces of the circuit 4—5—6 under substantially all conditions of generator load.

It will, in general, be found that, in order to cause the currents in the armature circuits to be in phase with the electromotive forces of the distributing circuit 4—5—6, the counter-electromotive forces of the armatures, when the machines operate as motors, should lag behind the electromotive forces of the circuit 4—5—6, and the generated electromotive forces, when the machines operate as generators, should lead the electromotive forces of the circuit 4—5—6. These conditions will be better understood from a consideration of the vector diagrams of Figs. 4, 5, 6 and 7 that illustrate the phase relations with respect to only one of the machines, and in which $E_1$, $E_2$ and $E_3$ are the line voltages, or those of the circuit 4—5—6, $E_1$ representing the voltage of the circuit to which the armature of the machine under consideration is connected. $E$ is the electromotive force derived from the three-phase transformer and applied to the field circuit and it is the resultant of one of the line electromotive forces, $E_3$, and an electromotive force in phase with that applied to the armature, or $E_1$. It is also the resultant of electromotive forces $E_t$, $E_r$ and $E_3$. $E_t$ is the electromotive force applied to the field winding. $E_r$ is the electromotive force applied to an external ohmic resistance inserted in the field circuit when operating the machine as a generator in the systems of Figs. 2 and 3, to be hereinafter described. $E_x$ is the electromotive force applied to the impedance device inserted in the field circuit when operating the machine as a motor. It is evident that, if the power factor of the impedance device is the same as that of the field winding, electromotive forces $E_x$ and $E_f$ will agree in phase, and no shifting of the phase relations will be effected by including the impedance device in circuit with the field winding. It will, however, be understood that it is not essential, under all conditions, that the power factor of the impedance device be the same as that of the field winding, because the shifting of the phase relations that would otherwise result may readily be compensated for in the remainder of the system. $E_g$ is the generated electromotive force when the machine operates as a generator, and the counter-electromotive force when the machine operates as a motor. $I_f$ is the field current which is substantially 90° in phase behind the field electromotive force $E_f$, because in practice the ohmic resistance of the field winding is very low as compared with its inductive resistance. The electro-motive force $E_g$ is in phase with the field current $I_f$. I is the current in the armature circuit. $E_1 E_g$ represents the impedance drop in the armature circuit. $E_1 X$ is the resistance component of the impedance drop, $E_1$—$E_g$, and is in phase with the current I. It is opposed to, and is overcome by, the line electromotive force, $E_1$, when the machine operates as a motor, and it is overcome by the generated electromotive force, $E_g$, when the machine operates as a generator, so that it is then added to the line electromotive force, $E_1$. $E_g X$ is the inductive drop in the armature circuit, or the inductive component of the impedance drop, $E_1 E_g$, and it is therefore 90° out of phase with the current I.

Figure 4:
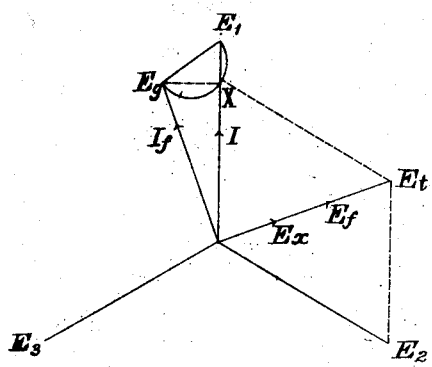
Figure 5:
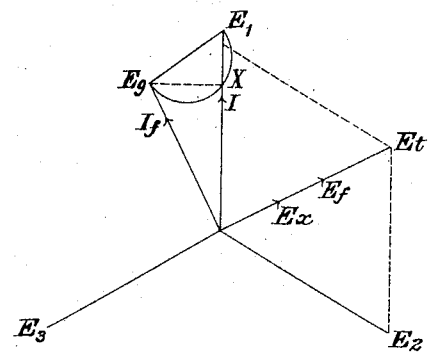
Figure 6:
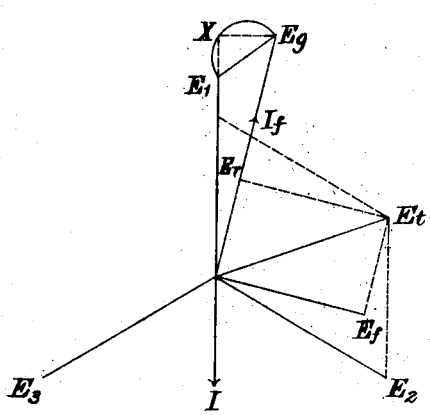
Figure 7:
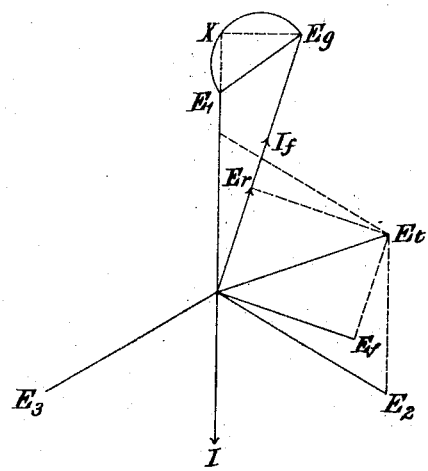

Figs. 4 and 5 represent the phase relations that exist when the machine operates as a motor under different loads, as represented by the difference in the lengths of the current vectors I, and also by the increase in the impedance drop in the armature circuit, $E_1 E_g$. If there is no saturation of the magnetic circuits of the machine, the resistance and inductive components of the impedance drop will vary substantially in proportion to the variations in the amount of current I. If, therefore, it is desired to maintain the armature current I in phase with the line electromotive force $E_1$, it becomes necessary to adjust the phase angle between the electromotive forces $E_g$ and $E_1$ for a given, or for each, condition of load, or else to adjust it in accordance with variations in load, and it is the purpose of the controller 15 of Fig. 1, and one of the prime objects of the invention, to effect this result. It will be understood that, for motor operation under the conditions set forth, the counter-electromotive force, $E_g$, should be less than the line electromotive force, $E_1$, and should lag behind it in phase, but for generator operation it will be understood, from an inspection of Figs. 6 and 7, which illustrate the phase relations existing under different conditions of generator load, that the generated electromotive force, $E_g$, should be greater than the line electromotive force, $E_1$, and should be ahead of it in phase, in order that the current I in the armature circuit may flow against the line electromotive force $E_1$. The currents in the armature circuit are taken as of the same value in Figs. 4 and 6 and also in Figs. 5 and 7, and the effect upon the phase relations caused by changes in load and by changing from motor to generator operation are clearly apparent, it being specially noted that, in the case of generator operation, as well as when the machine operates as a motor, the phase angle between the electromotive forces, $E$ and $E_1$, should be adjusted in accordance with variations in load in order that the armature current, I, may always agree in phase with the line electromotive force $E_1$. This result is effected by means of the controller 15 of Fig. 1.

In Fig. 2, three subdivided, auxiliary transformer windings 31 are connected between the vertices of the delta-connected transformer windings 9, 10 and 11, and intermediate points of the respective opposite windings, and the field magnet windings 16, 17 and 18 are connected between different sets of points of the said auxiliary windings in accordance with the variations in the amount of current required by the translating devices, by means of a controller 32, the structure and mode of operation of which may be similar to the controller 15 of Fig. 1, the stationary contact terminals of controller 32 being connected to the several points of subdivision of the auxiliary transformer windings. By this means, the electromotive forces applied to the field magnet windings and, consequently, also the field strengths, may be varied in accordance with the variations in the amount of current required by the translating devices so that the dynamo-electric machines may be caused to change automatically from motors to generators, and vice versa, and also so that the field strengths may be correct for all conditions of both motor and generator loads. In order to shift the phases of the counter and generated electromotive forces of the armatures with respect to the electromotive forces of the circuit 4—5—6, for the purpose of maintaining the currents in the armature circuits in phase with the electromotive forces of the circuit 4—5—6, under all conditions of load and whether operating the machines as motors or generators, resistances 33 of varying amounts are included in series with the connections between the stationary contact terminals of the controller 32 and the points of subdivision of the auxiliary transformer windings 31. The effect upon the phase relations of the system of introducing the resistances 33 into the field circuits will be readily understood from an inspection of the vector diagrams of Figs. 4, 5, 6 and 7.

In Fig. 3, the field magnet windings 16, 17 and 18 are connected between the vertices of the delta-connected transformer windings and intermediate points of the windings opposite, and for motor operation impedance devices 34, preferably of the same power factors as the field windings, are connected in series with the field windings for the purpose of reducing the voltages applied to the said windings and, consequently, also the field strengths, the active lengths of the windings of the impedance devices being adjusted in accordance with the variations in the amount of current required by the translating devices by means of a controller 35 that is similar in construction and mode of operation to those of Figs. 1 and 2. In order to shift the phases of the electromotive forces applied to the field windings so as to cause the currents in the armature circuits to agree approximately in phase with the electromotive forces of the circuit 4—5—6, ohmic resistance devices 36 are included in series circuit with the field windings, the amounts of resistance being increased in gradations as the amount of current required by the translating devices increases. Also, in order to provide for an increase of generator field strength as the current required by the translating devices increases, gradually decreasing amounts of impedance afforded by devices 37 are included in series circuit with the field windings.

The invention may also be employed in connection with a two-phase system of distribution, such as that shown in Fig. 8, in which mechanically coupled armatures 38 and 39, having large masses and considerable inertia, or a fly-wheel 40 coupled thereto, are connected to the respective phases of a two-phase distributing circuit comprising conductors 41, 42, 43 and 44 that are supplied from a suitable source 45, a load for the system being provided as previously indicated, by means of induction motors or other suitable translating devices 30. Field magnet windings 46 and 47 of the dynamo-electric machines are connected to other phases of the distributing circuit than those to which the corresponding armatures are connected, so that electromotive forces are applied to the field circuits substantially 90° out of phase with the electromotive forces of the circuits to which the corresponding armatures are connected. In order to cause the machines to operate as motors with the currents in the armature circuits substantially in phase with the electromotive forces of the circuit 41—42—43—44, when the amount of current required by the translating devices falls below a predetermined value, the electromotive forces applied to the field windings are adjusted in phase with respect to the electromotive forces of the circuit 41—42—43—44, by including in the field circuits varying active lengths of transformer windings 48, upon which are impressed electromotive forces of the same phases as those of the circuits to which the corresponding armatures are connected. The active lengths of the portions of the transformer windings included in the field circuits are adjusted in accordance with variations in the amount of current required by the translating devices, by means of a controller 49 similar in construction and mode of operation to those previously described. In order, also, to reduce the electromotive forces applied to the field windings for motor operation, impedance devices 13, of preferably the same power factors as the field windings, are included in series with the field windings. For the purpose of causing the electromotive forces generated by the armatures, when the machines are operated as generators, to lead in phase the electromotive forces of the circuits to which the armatures are connected, so that the currents in the armature circuits may flow against the electromotive forces of the circuit 41—42—43—44, resistance devices 50 are included in the field circuits, the amounts of resistance being adjusted in accordance with variations in the amount of current required by the translating devices. The field strengths, when operating the machines as generators, are caused to increase with increase of load upon the system, by including gradually decreasing amounts of impedance afforded by devices 13 in the field circuits.

The phase relations of the currents and electromotive forces in the system of Fig. 8 will be readily understood from an inspection of the vector diagrams of Figs. 9 and 10, Fig. 9 illustrating the relations existing when a single machine is operated as a motor, and Fig. 10 illustrating the relations when the same machine is operated as a generator. The reference characters employed in these diagrams have the same signification as in Figs. 4, 5, 6 and 7 with the addition of line $E_y$, which represents the electromotive force impressed upon the field circuit by the transformer 48, this electromotive force being in phase with the electromotive force, $E_1$, of the circuit to which the armature is connected. The electromotive force applied to the field circuit is, therefore, the resultant of electromotive forces $E_2$ and $E_y$, which lags in phase behind the electromotive force $E_2$ and causes the counter-electromotive force $E_g$ to lag behind the electromotive force $E_1$, in order to obtain substantial phase coincidence of the current I with the electromotive force $E_1$, for motor operation. The insertion of resistance in the field circuit when operating the machines as generators effects a shifting of the phase of the electromotive force $E_g$ with respect to the electromotive force $E_1$ in the same manner as has been previously described.

The invention may also be embodied in a single-phase system of distribution, such as is illustrated in Fig. 11, by providing an exciter generator 60 for the field magnet winding 61 of the dynamo-electric machine, the armature 62 of which is connected to single-phase circuit conductors 63 and 64 and is mechanically coupled to a fly-wheel 65. The field magnet winding 66 of the exciter generator is supplied from the circuit 63—64, and the exciter is operated by means of a motor 67 that is also supplied from the circuit 63—64. As in the two-phase system of Fig. 8, varying amounts of resistance afforded by a device 69 are included in series with the field winding 61 for generator operation, and for motor operation varying active lengths of a transformer winding 70 are included in the field circuit, an electromotive force being impressed upon the winding 70 in phase with that of the circuit 63—64. The electromotive force applied to the field winding, and consequently the field strength also, is reduced for motor operation by including an impedance device 71, of substantially the same power factor as that of the field winding, in series with the field winding. It will be understood that the effect of using an exciter generator of the commutator type for supplying a field winding is substantially the same as connecting the field winding to a circuit having an electromotive force 90° out of phase with the circuit to which the armature is connected as in the case of the two-phase systems previously described, since the electromotive force applied to the field winding of the exciter generator is substantially 90° out of phase with the electromotive force generated by the exciter armature. It is, therefore, unnecessary to describe the phase relations existing in the system of Fig. 11.

As here shown, the ratio of the electromotive forces of the armatures of the machines to the electromotive forces of the distributing circuit is adjusted by varying the field strengths of the machines, but this result may be secured in any other desired manner without departing from the spirit of the invention or altering its mode of operation, and many other modifications of the systems herein set forth may also be made within the scope of the invention.

I claim as my invention:

1. The combination with an alternating current distributing circuit, and a dynamo-electric machine adapted to operate either as a motor or as a generator and having its armature connected to said circuit, of means for applying an electromotive force to the field magnet winding, and means for adjusting the phase of said electromotive force in accordance with the variations in the amount of current required from the distributing circuit.

2. The combination with an alternating current distributing circuit, and a dynamo-electric machine adapted to operate either as a motor or as a generator and having its armature connected to said circuit, of means for applying an electromotive force to the field magnet winding of the machine, and means for adjusting both the phase and value of the said electromotive force in accordance with the variations in the amount of current required from the distributing circuit.

3. The combination with an alternating current distributing circuit, and a dynamo-electric machine adapted to operate either as a motor or as a generator and having its armature connected to said circuit, of means for adjusting both the phase and value of the electromotive force applied to the field magnet winding of the machine in accordance with the variations in the amount of current required from the distributing circuit to cause the current in the armature circuit to agree approximately in phase with the electromotive force of the distributing circuit, whether the machine operates as a motor or as a generator and under substantially all conditions of current load.

4. The combination with an alternating current distributing circuit, and a dynamo-electric machine connected thereto, of means for adjusting the field strength of the machine to cause it to operate as a motor when the current required from the distributing circuit is less than a predetermined amount, and to operate as a generator when the said current is greater than the predetermined amount, and means for adjusting the phase of the electromotive force applied to the field magnet winding.

5. The combination with an alternating current distributing circuit, and a dynamo-electric machine connected thereto, of means for causing the machine to operate as a motor when the current required from the distributing circuit is less than a predetermined amount and to operate as a generator when the said current exceeds the predetermined amount, and means for adjusting the phase of the electromotive force applied to the field magnet winding.

6. The combination with an alternating current distributing circuit, and a dynamo-electric machine connected thereto, of means for causing the machine to operate as a motor when the current required from the distributing circuit is less than a predetermined amount, and to operate as a generator when the said current exceeds the predetermined amount, and means for causing the current in the armature circuit to agree approximately in phase with the electromotive force of the distributing circuit.

7. The combination with an alternating current distributing circuit, and a dynamo-electric machine connected thereto, of means for adjusting the field strength of the machine to cause it to operate as a motor when the current required from the distributing circuit is less than a predetermined amount, and to operate as a generator when the said current is greater than the predetermined amount, and for adjusting the phase of the electromotive force applied to the field magnet winding to cause the current in the armature circuit to agree approximately in phase with the electromotive force of the distributing circuit.

8. The combination with an alternating current distributing circuit, and a dynamo-electric machine connected thereto and adapted to operate either as a motor or as a generator, of means for causing the counter-electromotive force of the machine, when operating as a motor, to lag behind the electromotive force of the distributing circuit, and the electromotive force generated by the machine, when operating as a generator, to lead the electromotive force of the distributing circuit.

9. The combination with an alternating current distributing circuit, and a dynamo-electric machine connected thereto and adapted to operate either as a motor or as a generator, of means for adjusting the phase of the electromotive force applied to the field magnet winding of the machine to cause the counter-electromotive force of the machine, when operating as a motor, to lag behind the electromotive force of the distributing circuit, and the electromotive force generated by the machine, when operating as a generator, to lead the electromotive force of the distributing circuit.

10. The combination with an alternating current distributing circuit, and a dynamo-electric machine connected thereto and adapted to operate either as a motor or as a generator, of means for adjusting the field strength of the machine to cause it to operate as a motor when the current required from the distributing circuit is less than a predetermined amount and to operate as a generator when the said current is greater than the predetermined amount, and means for adjusting the phase of the electromotive force applied to the field magnet winding to cause the counter electromotive force of the machine, when operating as a motor, to lag behind the electromotive force of the distributing circuit and the electromotive force generated by the machine, when operating as a generator, to lead the electromotive force of the distributing circuit.

11. The combination with an alternating current distributing circuit, and a dynamo-electric machine connected thereto and adapted to operate either as a motor or as a generator, of means for causing the machine to operate as a motor when the current required from the distributing circuit is less than a predetermined amount and to operate as a generator when the said current is greater than the predetermined amount, and means for adjusting the phase of the electromotive force applied to the field magnet winding to cause the counter electromotive force of the machine, when operating as a motor, to lag behind the electromotive force of the distributing circuit, and the electromotive force generated by the machine, when operating as a generator, to lead the electromotive force of the distributing circuit.

12. The combination with an alternating current distributing circuit, and a dynamo-electric machine connected thereto, of means for adjusting the ratio of the voltage applied to the field magnet winding with respect to that of said circuit to cause the machine to operate either as a generator or as a motor, according as the current required of the distributing circuit exceeds or is less than a predetermined amount, and means for causing the machine to receive current from, or to deliver current to, the distributing circuit of substantially the same phase as that of the distributing circuit.

13. The combination with an alternating current distributing circuit, and a dynamo-electric machine connected thereto and adapted to operate either as a motor or as a generator, of a variable ohmic resistance and a variable reactance in the circuit of the field magnet winding of the machine.

14. The combination with an alternating current distributing circuit and a dynamo-electric machine connected thereto and adapted to operate either as a motor or as a generator, of a reactance device and an ohmic resistance device in the field circuit of the machine, and means governing the amounts of resistance and reactance included in the field circuit that is responsive in operation to the variations in the amount of current required from the distributing circuit.

15. The combination with an alternating current distributing circuit, and a dynamo-electric machine connected thereto and adapted to operate either as a motor or as a generator, of means for causing the counter-electromotive force of the machine, when operating as a motor, to lag behind the electromotive force of the distributing circuit, and the electromotive force generated by the machine, when operating as a generator, to lead the electromotive force of the distributing circuit, and an impedance device included in the field circuit when the machine is operating as a motor.

16. The combination with an alternating current distributing circuit, and a dynamo-electric machine connected thereto and adapted to operate either as a motor or as a generator, of an ohmic resistance included in the field circuit of the machine when the same is operating as a generator, and means for reducing the field strength of the machine when the same is operating as a motor.

17. The combination with a polyphase alternating current distributing circuit, and a plurality of mechanically coupled dynamo-electric machines having their armatures associated, respectively, with different phases of said circuit and their field magnet windings associated with other phases of said circuit than those with which the corresponding armatures are associated, of means for adjusting the field strengths of the machines to cause them to operate as motors when the current required of the distributing circuit is less than a predetermined amount, and to operate as generators when the said current is greater than the predetermined amount, and means for adjusting the phases of the electromotive forces applied to the field magnet windings.

18. The combination with a polyphase alternating current distributing circuit, and a plurality of mechanically coupled dynamo-electric machines having their armatures associated, respectively, with different phases of said circuit and their field magnet windings associated with other phases of said circuit than those with which the corresponding armatures are associated, of means for causing the machines to operate as motors when the current required from the distributing circuit is less than a predetermined amount, and to operate as generators when the said current is greater than the predetermined amount, and means for adjusting the phases of the electromotive forces applied to the field magnet windings.

19. The combination with a polyphase alternating current distributing circuit, and a plurality of mechanically coupled dynamo-electric machines having their armatures associated, respectively, with different phases of said circuit and their field magnet windings associated with other phases of the circuit than those with which the corresponding armatures are associated, of means for adjusting the field strengths of the machines to cause them to operate as motors when the current required of the distributing circuit is less than a predetermined amount, and to operate as generators when the said current is greater than the predetermined amount, and means for adjusting the phases of the electromotive forces applied to the field magnet windings to cause the currents in the armature circuits to agree approximately in phase with the electromotive forces of the distributing circuit.

20. The combination with a polyphase alternating current distributing circuit and a plurality of mechanically coupled dynamo-electric machines having their armatures connected respectively to different pairs of conductors thereof, of three delta-connected transformer windings connected to the distributing circuit, the field magnet windings of the machines being supplied with currents derived from circuits extending between the intermediate points of the transformer windings that are connected to the same circuit conductors as the corresponding armatures of the machines and the connections between the other two transformer windings, and means for adjusting the phases of the electromotive forces applied to the field magnet windings to cause the currents in the armature circuits of the machines to agree approximately in phase with the electromotive forces of the distributing circuit.

21. The combination with a polyphase alternating current distributing circuit and a plurality of mechanically coupled dynamo-electric machines having their armatures connected respectively to different pairs of conductors thereof, of three delta-connected transformer windings connected to the distributing circuit, the field magnet windings of the machines being supplied with currents derived from circuits extending between the intermediate points of the transformer windings that are connected to the same circuit conductors as the corresponding armatures of the machines and the connections between the other two transformer windings, and means for adjusting both the phases and values of the electromotive forces applied to the field magnet windings of the machines to cause the same to operate as motors when the current required of the distributing circuit falls below a predetermined amount and to operate as generators when the said current exceeds the predetermined amount, and to cause the currents in the armature circuits to agree approximately in phase with the electromotive forces of the distributing circuit whether the machines operate as motors or as generators and under substantially all conditions of current load.

22. The combination with an alternating current distributing circuit, and a dynamo-electric machine connected thereto, of means for causing the machine to operate as a motor when the current required of the distributing circuit is less than a predetermined amount and as a generator when the said current is greater than the predetermined amount, and means for causing the counter electromotive force of the machine, when operating as a motor, to lag behind the electromotive force of the distributing circuit, and the electromotive force generated by the machine, when operating as a generator, to lead the electromotive force of the distributing circuit.

In testimony whereof, I have hereunto subscribed my name this 24th day of August, 1907.

WILLIAM COOPER.

Witnesses:
HOWARD L. BEACH,
BIRNEY HINES.